(12) United States Patent
Woodson et al.

(10) Patent No.: US 7,163,250 B2
(45) Date of Patent: Jan. 16, 2007

(54) LOAD FLOOR ASSEMBLY

(75) Inventors: Brett N. Woodson, Plymouth, MI (US); Jay Ennis, Windsor (CA); Brandon Ye, Windsor (CA)

(73) Assignee: BBI Enterprises, L.P., Bloomfield Hills, MI (US)

( * ) Notice: Subject to any disclaimer, the term of this patent is extended or adjusted under 35 U.S.C. 154(b) by 166 days.

(21) Appl. No.: 10/932,861

(22) Filed: Sep. 2, 2004

(65) Prior Publication Data
US 2005/0088014 A1    Apr. 28, 2005

Related U.S. Application Data

(60) Provisional application No. 60/499,482, filed on Sep. 2, 2003.

(51) Int. Cl.
*B60N 3/12* (2006.01)

(52) U.S. Cl. .............................. 296/37.14; 296/193.07; 428/167; 156/87

(58) Field of Classification Search ............. 296/37.14, 296/191, 193.07; 428/167, 172, 169; 156/87
See application file for complete search history.

(56) References Cited

U.S. PATENT DOCUMENTS

| | | | |
|---|---|---|---|
| 1,831,058 A | 11/1931 | Cumfer | |
| 2,011,468 A | 8/1935 | Bronson | |
| 2,264,628 A | 12/1941 | Engert et al. | |
| 2,599,604 A | 6/1952 | Bauer et al. | |
| 3,355,341 A | 11/1967 | Bertsche | |
| 3,962,015 A | 6/1976 | Heimann | |
| 4,042,746 A | 8/1977 | Hofer | |
| 4,086,382 A | 4/1978 | Hites | |
| 4,423,900 A | 1/1984 | Sugimoto et al. | |
| 4,849,267 A * | 7/1989 | Ward et al. ................. | 428/41.3 |
| 5,016,934 A | 5/1991 | Pelz | |
| 5,268,228 A | 12/1993 | Orr | |
| 5,330,597 A | 7/1994 | Leuchten et al. | |
| 5,362,120 A | 11/1994 | Cornille, Jr. | |
| 5,437,924 A | 8/1995 | Decker, III et al. | |
| 5,736,470 A | 4/1998 | Schneberger et al. | |
| 5,836,637 A * | 11/1998 | Laginess et al. .............. | 296/75 |
| 5,971,462 A | 10/1999 | Bell et al. | |
| 6,139,945 A | 10/2000 | Krejchi et al. | |
| 6,358,599 B1 | 3/2002 | Deibel et al. | |
| 6,524,675 B1 | 2/2003 | Mikami et al. | |
| 2001/0046587 A1 | 11/2001 | Michael et al. | |
| 2003/0178124 A1 | 9/2003 | Mikami et al. | |
| 2004/0021342 A1* | 2/2004 | Fujimoto ............... | 296/193.11 |

\* cited by examiner

*Primary Examiner*—Joseph D. Pape
(74) *Attorney, Agent, or Firm*—Howard & Howard Attorneys, P.C.

(57) ABSTRACT

A load floor (22) for a motor vehicle (20) has a foamed substrate layer (34) having a peripheral edge (42) and a facing layer (32), formed from hardboard or other sheet material. An adhesive layer (36) adheres the substrate layer (34) to the facing layer (32). Grooves (68, 70) are formed on a top surface (40) of the substrate layer (34) and extend to the peripheral edge (42) to provide an egress for fluids at the peripheral edge (42) during curing of the adhesive layer (36). The grooves (68, 70) are curved to prevent cracking of the substrate layer (34) under an applied load (74).

23 Claims, 3 Drawing Sheets

LOAD FLOOR ASSEMBLY

RELATED APPLICATIONS

The subject patent application claims priority to and all the benefits of U.S. Provisional Patent Application Ser. No. 60/499,482, filed on Sep. 2, 2003.

BACKGROUND OF THE INVENTION

1. Field of the Invention

The subject invention relates generally to an interior component for a motor vehicle which provides a structural surface. More specifically, the present invention relates to a load floor of a motor vehicle.

2. Description of the Prior Art

The progression of motor vehicles, such as, for example, sport utility vehicles and station wagons, have included a desire to make full use of the space for storage. One such example is the inclusion of additional storage compartments located in a lower surface of a cargo area of the motor vehicle. These storage compartments are concealed by a structural component such as, for example, a load floor, which must also provide structural integrity to support the mass of heavy objects being transported in the cargo area of the motor vehicle on top of the load floor.

Various attempts have been made to produce load floors that exhibit structural integrity while supporting objects having a heavy mass. Presently, removable load floors are produced from blow molding a polypropylene material, possibly glass filled, which is extremely heavy and not structurally sound. Alternatively, glass reinforced polyurethane has also been used. While glass-reinforced polyurethane is typically lighter than blow-molded polypropylene, it is extremely expensive and tends to flex under stress.

Attempts have been made to replace polypropylene and urethane materials with laminates that are a stiff board-like material having a foamed substrate layer sandwiched between facing layers. While these laminates have produced mass and cost savings, they have not always produced adequate structural integrity. This is believed in part to be due to the interface between the foamed substrate layer and the facing layers. Therefore, it would be desirable to produce a load floor providing adequate structural integrity while maintaining a low cost and a low mass.

SUMMARY OF THE INVENTION AND ADVANTAGES

The present invention relates to a load floor for a vehicle comprising a first facing layer having a first inner surface, a substrate layer having a top surface and a peripheral edge, and a first adhesive layer disposed between the surfaces for bonding the first facing layer to the substrate layer. Additionally, grooves, that are curved, extend along the top surface to the peripheral edge for providing an egress for fluids at the peripheral edge during curing of the first adhesive layer.

The subject invention also provides a method of constructing a load floor for a motor vehicle having a substrate layer, a facing layer and an adhesive layer. The method comprises the steps of forming a plurality of grooves on the substrate layer, rolling the adhesive layer onto the facing layer, pressing the adhesive layer onto the substrate layer with the grooves disposed therebetween, and heating the facing layer and the substrate layer to cure the adhesive layer.

Accordingly, it would be advantageous to provide a load floor for a motor vehicle that is strong enough to support the loads consistent with a cargo area of the motor vehicle while also being lightweight.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE PREFERRED EMBODIMENT

Figure 1:
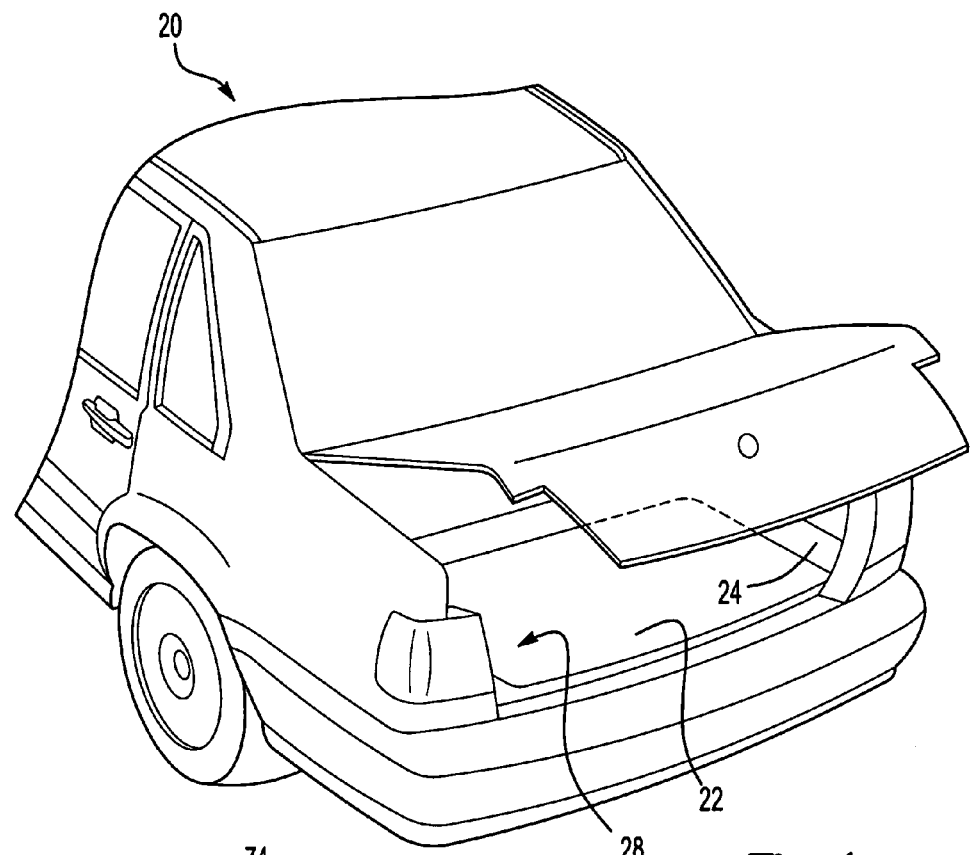
FIG. 1 is an environmental view of a load floor inserted into a cargo area of a motor vehicle.
Figure 2:
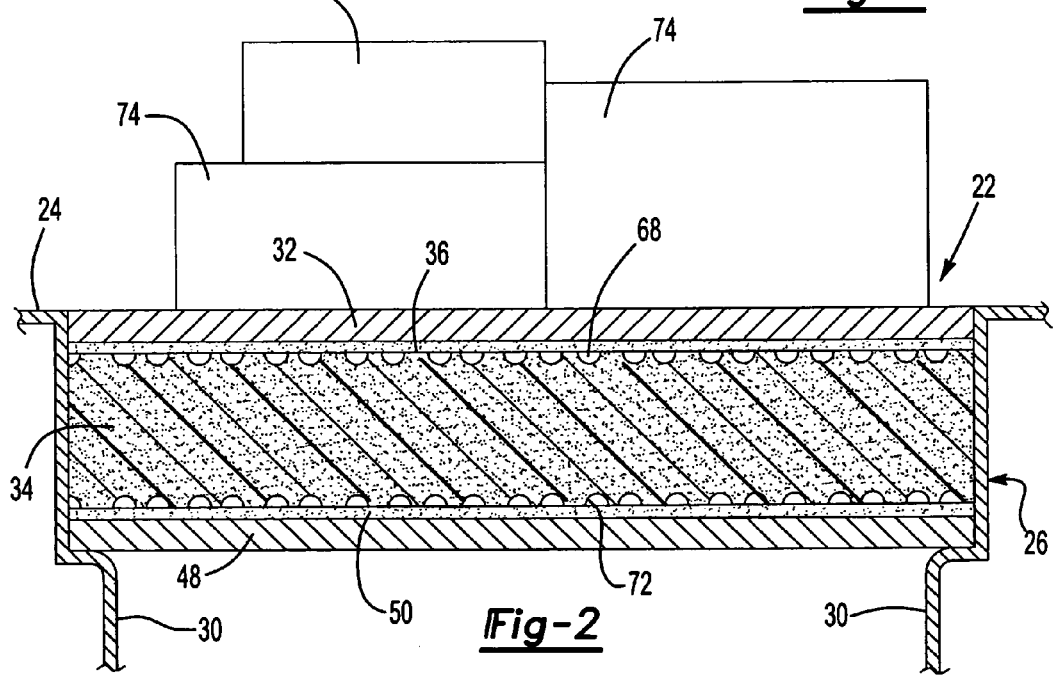
FIG. 2 is a sectional side view of a load floor inserted into an opening in a floor panel of a motor vehicle.
Figure 3:
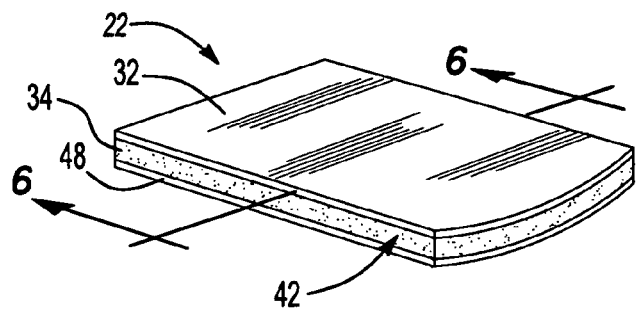
FIG. 3 is a perspective view of a load floor for a motor vehicle.
Figure 4:
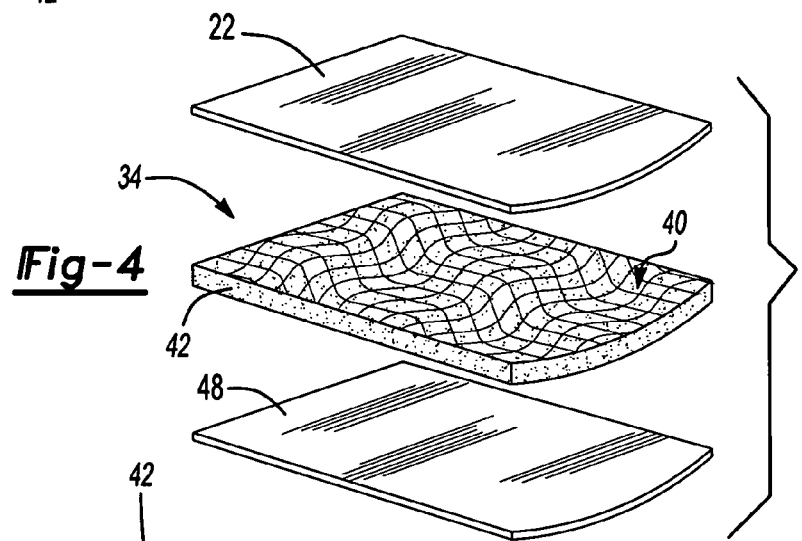
FIG. 4 is an exploded view of a load floor for a motor vehicle.
Figure 5:
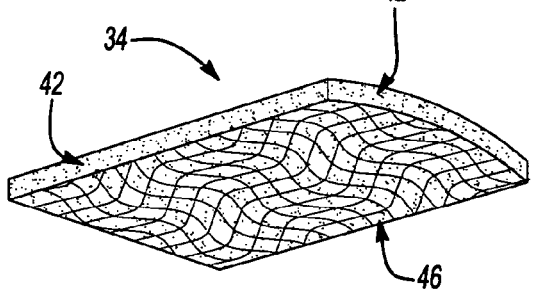
FIG. 5 is a perspective view of a substrate layer of a load floor for a motor vehicle having grooves disposed thereon.
Figure 6:
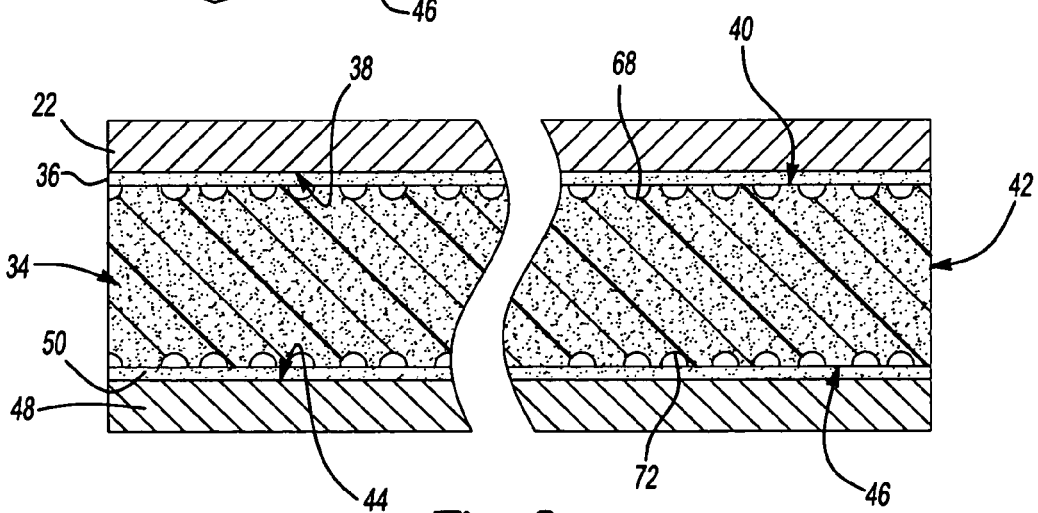
FIG. 6 is a sectional side view of a load floor for a motor vehicle.

A motor vehicle is shown generally at 20. The motor vehicle 20 includes a floor panel 24, a tub portion 26, and a load floor 22. The tub portion 26, located below the floor panel 24, presents a cargo space 28 having an opening 30 in the floor panel 24. The load floor 22, which closes the opening 30, supports various loads 74 that are positioned upon the load floor 22.

The load floor 22 includes a first facing layer 32, a substrate layer 34, and a first adhesive layer 36. The first facing layer 32 has a first inner surface 38. The first facing layer 32 includes hardboard or any other suitable piece of rigid material that is generally planar. The substrate layer 34 has a top surface 40 and a peripheral edge 42. The substrate layer 34 includes polymeric foam that is expanded polystyrene foam. However, any type of structural foam can be used. The first adhesive layer 36 is disposed between the surfaces 38, 40 for bonding the first facing layer 32 to the substrate layer 34. Additionally, a second facing layer 48, having a second inner surface 44, is disposed in opposition to the top surface 40 on the substrate layer 34 and shares the peripheral edge 42 with the top surface 40. A second adhesive layer 50 is disposed between the bottom surface 46 and the second inner surface 44 for bonding the second facing layer 48 to the substrate layer 34.

Figure 7:
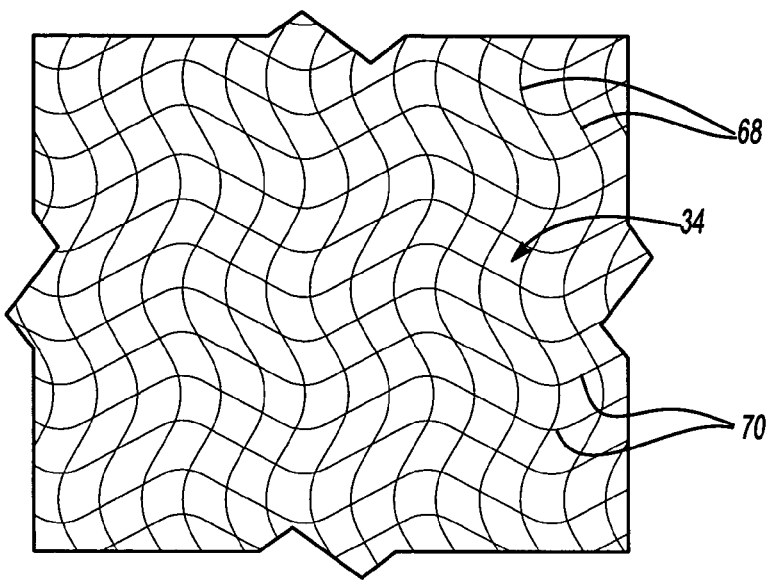
FIG. 7 is a planar view of a substrate layer of a load floor for a motor vehicle.

The load floor 22 is constructed by forming a plurality of grooves 68 on the top surface 40 of the substrate layer 34 to provide an egress for fluids, such as, for example, water vapor, at the peripheral edge 42 during curing of the first adhesive layer 36. The grooves 68 are curved to define a plurality of sinuous and parallel grooves 68. Furthermore, the grooves 68 are nested to overlap in the general parallel direction. Each of the grooves 68 has a first end 52, at the peripheral edge 42, and a second end 54, at the peripheral edge 42. A second set of grooves 70 extend across and intersect the first mentioned grooves 68 to create a crisscross pattern, as shown in FIG. 7. Additionally, a second set of curved grooves 72 can be formed on the bottom surface 46 of the substrate layer 34 if a second adhesive layer 50 is used to adhere a second facing layer 48 to the substrate layer 34.

Figure 8:
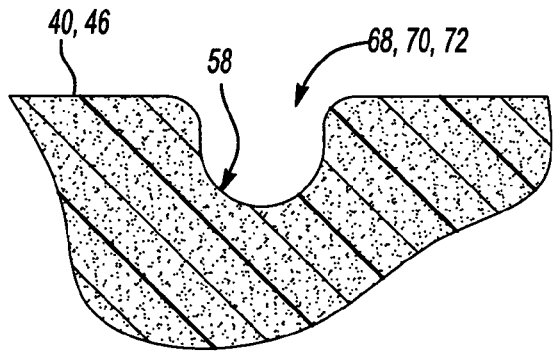
FIG. 8 is a cross-sectional view of a groove of a load floor for a motor vehicle.
Figure 9:
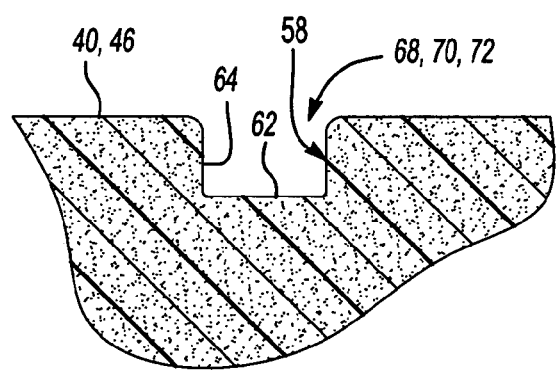
FIG. 9 is a cross-sectional view of a groove of a load floor for a motor vehicle.
Figure 10:
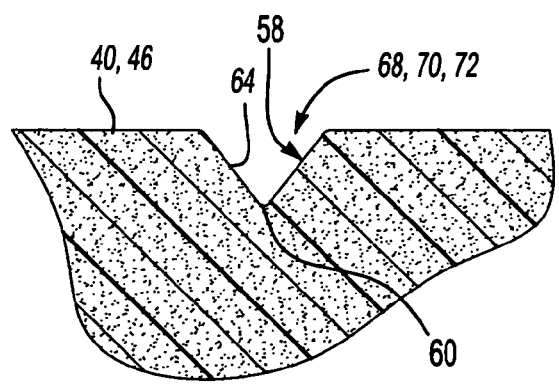
FIG. 10 is a cross-sectional view of a groove of a load floor for a motor vehicle.

Each of the grooves 68, 70, 72 has a cross-section 56 with a boundary 58 that is continuously curved. The shape of the cross-section 56 is preferably a circular shape, as shown in FIG. 8. Alternatively, the shape of the cross-section 56 is v-shaped with a curved apex 60, as shown in FIG. 10. Additionally, the shape of the cross-section 56 includes a flat bottom 62 and walls 64 that extend upwardly from the bottom 62 to define a pair of corners 66, as shown in FIG. 9. However, any transition in the boundary 58, such as the apex 60 or the corners 66 is preferably radiused. The radiused transitions 60, 66 help preserve the structural integrity of the load floor 22 to prevent propagation of cracks in the substrate layer 34 under an applied load 74.

It is also important that the grooves 68, 70, 72 are curved. The load floor 22 supports a load 74 consistent with the usage of the cargo space 28 of a motor vehicle 20 without deflecting, or breaking when the grooves 68, 70, 72 are curved. The boundary 58 of the cross-section 56 of the grooves 68, 70, 72 is preferably free from sharp corners to similarly reduce the stress of the substrate layer 34 and prevent breakage of the substrate layer 34 and the load floor 22 under a load 74.

The first adhesive layer 36 is applied to the first inner surface 38 of the first facing layer 32. The first adhesive layer 36 includes water based adhesive, or any other suitable adhesive. The first adhesive layer 36 is typically applied by rolling the adhesive. However, other methods of applying an adhesive, such as spraying, can also be used.

The first adhesive layer 36 of the first facing layer 32 is pressed onto the top surface 40 of the substrate layer 34, and over the first set of grooves 68, 70. If a second facing layer 48 is desired for the load floor 22, the previous steps are repeated to attach the second facing layer 48 to the bottom surface 46 of the substrate layer 34.

The first and second facing layers 32, 48 are heated to a high temperature to cure the adhesive layers 36, 50. The first and second adhesive layers 36, 50 are cured rapidly to prevent the heat from melting the substrate layer 34. However, the heat also causes the adhesive 36, 50 to give off moisture while it cures. If the moisture is not provided an egress, the moisture collects between the adhesive layers 36, 50 and the substrate layer 34, causing pockets of moisture to form. These pockets of moisture prevent adequate adhesion of the facing layers 32, 48 to the substrate layer 34, thus weakening the structural integrity of the load floor 22. The grooves 68, 70, 72 that are disposed on the top and bottom surfaces 40, 46 of the substrate layer 34 provide the egress for the moisture at the peripheral edge 42 of the substrate layer 34. Although it is not required for the grooves 68, 70, 72 to have the crisscross pattern, this pattern provides benefits. By providing more locations on the peripheral edge 42 for the egress of moisture, the cycle-time for curing the load floor is decreased. Additionally, although the adhesive layers 36, 50 are applied thin enough to prevent the adhesive from entering the grooves 68, 70, 72 on the top and bottom surfaces 40, 46, if the adhesive layer does enter any of the grooves 68, 70, 72, the moisture is provided with alternative locations for escape.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A load floor for a motor vehicle comprising:
   a first facing layer having a first inner surface;
   a substrate layer having a top surface and a peripheral edge and a bottom surface disposed in opposition to said top surface on said substrate layer and sharing said peripheral edge with said top surface;
   a first adhesive layer disposed between said surfaces for bonding said first facing layer to said substrate layer;
   a first set of curved grooves extending along said top surface to said peripheral edge for providing an egress for fluids at said peripheral edge during curing of said first adhesive layer; and
   a second set of curved grooves extending along said bottom surface to said peripheral edge for providing an egress for fluids at said peripheral edge during curing of said second adhesive layer.

2. A load floor as set forth in claim 1 wherein said grooves are sinuous.

3. A load floor as set forth in claim 2 wherein said grooves are parallel to one another.

4. A load floor as set forth in claim 3 wherein said grooves are nested in said substrate layer and extend in a general parallel direction.

5. A load floor as set forth in claim 4 wherein each of said grooves has a first end at said peripheral edge and a second end at said peripheral edge.

6. A load floor as set forth in claim 5 including a second set of said grooves extending across and intersecting said first mentioned grooves.

7. A load floor as set forth in claim 6 wherein each of said grooves has a cross-section being continuously curved.

8. A load floor as set forth in claim 7 wherein said cross section is circular.

9. A load floor as set forth in claim 8 wherein said cross section is a v-shape with a curved apex.

10. A load floor as set forth in claim 9 wherein said cross section includes a flat bottom and walls extending upwardly from said bottom.

11. A load floor as set forth in claim 1 further including:
    a second facing layer having a second inner surface; and
    a second adhesive layer disposed between said bottom surface and said second inner surface for bonding said second facing layer to said substrate layer.

12. A load floor as set forth in claim 11 wherein said facing layer comprises hardboard.

13. A load floor as set forth in claim 12 wherein said substrate layer comprises structural foam.

14. A load floor as set forth in claim 12 wherein said substrate comprises polymeric foam.

15. A load floor as set forth in claim 12 wherein said substrate layer comprises expanded polystyrene foam.

16. A load floor as set forth in claim 12 wherein said adhesive layer comprises water based adhesive.

17. A motor vehicle comprising:
a floor panel;
a tub portion located below said floor panel and presenting a cargo space having an opening in said floor panel;
a load floor closing said opening for supporting various loads positioned thereon including:
at least one facing layer having an inner surface,
a substrate layer having a top surface and a peripheral edge and a bottom surface disposed in opposition to said top surface on said substrate layer and sharing said peripheral edge with said top surface,
at least one adhesive layer disposed between said surfaces for bonding said at least one facing layer to said substrate layer,
grooves extending along said top surface and said bottom surface to said peripheral edge for providing an aggress for fluids at said peripheral edge during curing of said at least one adhesive layer, and
said grooves being curved.

18. A load floor for a motor vehicle comprising:
a first facing layer having a first inner surface;
a substrate layer having a top surface and a peripheral edge and a bottom surface disposed in opposition to said top surface on said substrate layer and sharing said peripheral edge with said top surface;
a first adhesive layer disposed between said surfaces for bonding said first facing layer to said substrate layer;
a first set of grooves extending along said top surface to said peripheral edge for providing an egress for fluids at said peripheral edge during curing of said first adhesive layer with said grooves being curved and sinuous and parallel to one another;
said grooves being nested in said substrate layer and extending in a general parallel direction;
each of said grooves having a first end at said peripheral edge and a second end at said peripheral edge;
a second set of said grooves extending across and intersecting said first mentioned grooves;
a second facing layer having a second inner surface;
a second adhesive layer disposed between said bottom surface and said second inner surface for bonding said second facing layer to said substrate layer; and
a second set of curved grooves extending along said bottom surface to said peripheral edge for providing an egress for fluids at said peripheral edge during curing of said second adhesive layer.

19. A load floor as set forth in claim 18 wherein said facing layer comprises hardboard.

20. A load floor as set forth in claim 18 wherein said substrate layer comprises structural foam.

21. A load floor as set forth in claim 18 wherein said substrate comprises polymeric foam.

22. A load floor as set forth in claim 18 wherein said substrate layer comprises expanded polystyrene foam.

23. A load floor as set forth in claim 18 wherein said adhesive layer comprises water based adhesive.

* * * * *